United States Patent (10) Patent No.: US 8,254,454 B2
Chao et al. (45) Date of Patent: Aug. 28, 2012

(54) APPARATUS AND METHOD FOR REDUCING TEMPORAL NOISE

(75) Inventors: Po-Wei Chao, Taipei Hsien (TW); Hsin-Ying Ou, Hsin-Chu (TW)

(73) Assignee: Realtek Semiconductor Corp., Hsinchu (TW)

(*) Notice: Subject to any disclaimer, the term of this patent is extended or adjusted under 35 U.S.C. 154(b) by 1509 days.

(21) Appl. No.: 11/747,242

(22) Filed: May 11, 2007

(65) Prior Publication Data

US 2007/0263126 A1 Nov. 15, 2007

(30) Foreign Application Priority Data

May 12, 2006 (TW) .............................. 95116900 A

(51) Int. Cl.
*H04N 7/12* (2006.01)
(52) U.S. Cl. ................................................ 375/240.16
(58) Field of Classification Search .................. None
See application file for complete search history.

(56) References Cited

U.S. PATENT DOCUMENTS

| 5,657,401 | A | 8/1997 | De Haan | |
|---|---|---|---|---|
| 7,136,538 | B2 * | 11/2006 | Kitagawa | 382/275 |
| 7,639,741 | B1 * | 12/2009 | Holt et al. | 375/240.08 |
| 7,769,089 | B1 * | 8/2010 | Chou | 375/240.29 |
| 2006/0139494 | A1 * | 6/2006 | Zhou et al. | 348/607 |

FOREIGN PATENT DOCUMENTS

WO 0135636 A1 5/2001

* cited by examiner

*Primary Examiner* — Mehrdad Dastouri
*Assistant Examiner* — James Anderson, II
(74) *Attorney, Agent, or Firm* — Thomas, Kayden, Horstemeyer & Risley, LLP

(57) ABSTRACT

Disclosed is a method for reducing temporal noise, comprising: performing motion detection on frames of a video data stream; calculating a pixel difference between pixels of frames in the video data stream to generate at least a pixel difference value; determining a set of weighting value for temporal filtering according to a result of the motion detection and a result of the pixel difference value calculation; and performing temporal filtering on frames in the video data stream according to the weighting values.

6 Claims, 5 Drawing Sheets

APPARATUS AND METHOD FOR REDUCING TEMPORAL NOISE

BACKGROUND OF THE INVENTION

1. Field of the Invention

The present invention generally relates to video processing, and more particularly, to a video processing method for reducing temporal noise of video images and apparatus thereof.

2. Description of the Prior Art

Noise processing along a time axis is a common form of image processing for reducing temporal noise of video images. Please refer to FIG. 1, FIG. 1 illustrates a typical temporal noise filtering module 100. The noise filtering module 100 includes a motion detector 110, a controller 120, and a temporal noise filter 130. The motion detector 110 receives an image signal S_P, which comprises a plurality of video frames, wherein the frames include at least a target frame $F_N$ to be processed and a frame $F_{N-1}$ prior in time to the target frame $F_N$. The motion detector 110 detects motion between the target frame $F_N$ and the previous frame $F_{N-1}$, and outputs an image motion determination value M to the controller 120. The controller 120 then outputs a filter factor W to the temporal noise filter 130 according to the image motion determination value M. The conventional temporal noise filtering mechanism generally adopts a predetermined threshold value for the controller 120, and determines that there is motion between the frame $F_N$ and $F_{N-1}$ if the image motion determination value M exceeds the predetermined threshold value. At this time, the filter factor W outputted by the controller 120 indicates that the temporal noise filter 130 will not perform filtering upon the target frame $F_N$. Conversely, it is determined that there is no motion between the frame $F_N$ and $F_{N-1}$, or the image is static, if the image motion determination value M is less than the threshold value. In this case the temporal noise filter 130 will perform filtering on the target frame $F_N$ according to the filter factor W from the controller 120, and outputs a filtered signal S_NR. Generally the conventional filtering method merely averages the pixel values of the same pixel respectively in the two frames, and then replaces the original value in the target frame $F_N$ with the average pixel value.

However, it seems crude to determine when to perform temporal noise reduction according simply to the degree of motion of the images, as described above. Additionally, the filtering method also appears overly simplified. Therefore, such a temporal noise reduction process may not be as accurate or effective as desired. Moreover, in order to minimize costs on hardware or required computational resources, conventional noise reducing or other image enhancement apparatuses reference only a single channel of the images, for example, only one of the RGB channels or one of the YUV channels when performing above-mentioned determination. The determination result referencing information from only a single channel is then used for controlling the filtering operation of the referenced channel as well as other channels. For example, the image motion determination result of the Y channel is used for controlling the filtering operation of all three of the Y, U, and V channels. As a result, because some of the channels are inadequately filtered due to referencing information not from their own channels, image quality degrades.

SUMMARY OF THE INVENTION

One objective of the present invention is therefore to provide an apparatus for reducing temporal noise of a target image frame.

One embodiment of the present invention disclose a method for reducing temporal noise, comprising: performing motion detection on frames of a video data stream; calculating a pixel difference between pixels of frames in the video data stream to generate at least a pixel difference value; determining a set of weighting value for temporal filtering according to a result of the motion detection and a result of the pixel difference value calculation; and performing temporal filtering on frames in the video data stream according to the weighting values.

Another embodiment of the present invention discloses a method for reducing temporal noise comprising: performing motion detection to frames of a video data stream; performing a first determination to determine if a current frame is static by comparing the current frame to at least one previous frame a time domain, and determining if the current frame is in motion by comparing the current frame to at least one following frame in a time domain; performing a second determination to determine if the current frame is static by comparing the current frame to at least one following frame in a time domain, and determining if the current frame is in motion by comparing the current frame to at least one previous frame in a time domain; setting the weighting value for temporal filtering operations as to a set of first predetermined weighting value if the first determination determines that the current frame is static, and setting the weighting value for temporal filtering operation to a set of second predetermined weighting value if the second determination determines the current frame is static; and performing temporal filtering operations to a plurality images of the video data stream according to the set weighting value.

Another embodiment of the present invention discloses an apparatus for filtering temporal noise, which comprises: a first channel temporal filtering module and a second channel temporal filtering module. The first channel temporal filtering module comprises: a first motion detector for generating at least one first detection value according to first channel information from a plurality frames in a video data stream; a first controller, coupled to the first motion detector, for determining a set of first weighting value for temporal filtering operations of a first channel according to the first detection value; and a first filter, coupled to the first controller, for performing temporal filtering to the first channel information of the video data stream according to the first weighting value. The second channel temporal filtering module, comprising: a second motion detector, for generating at least one second detection value according to second channel information from a plurality frames in the video data stream; a second controller, coupled to the second motion detector, for determining a set of second weighting values for temporal filtering operations of a second channel according to the second detection value; and a second filter, coupled to the second controller, for performing temporal filtering to the second channel information of the video data stream according to the second weighting value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
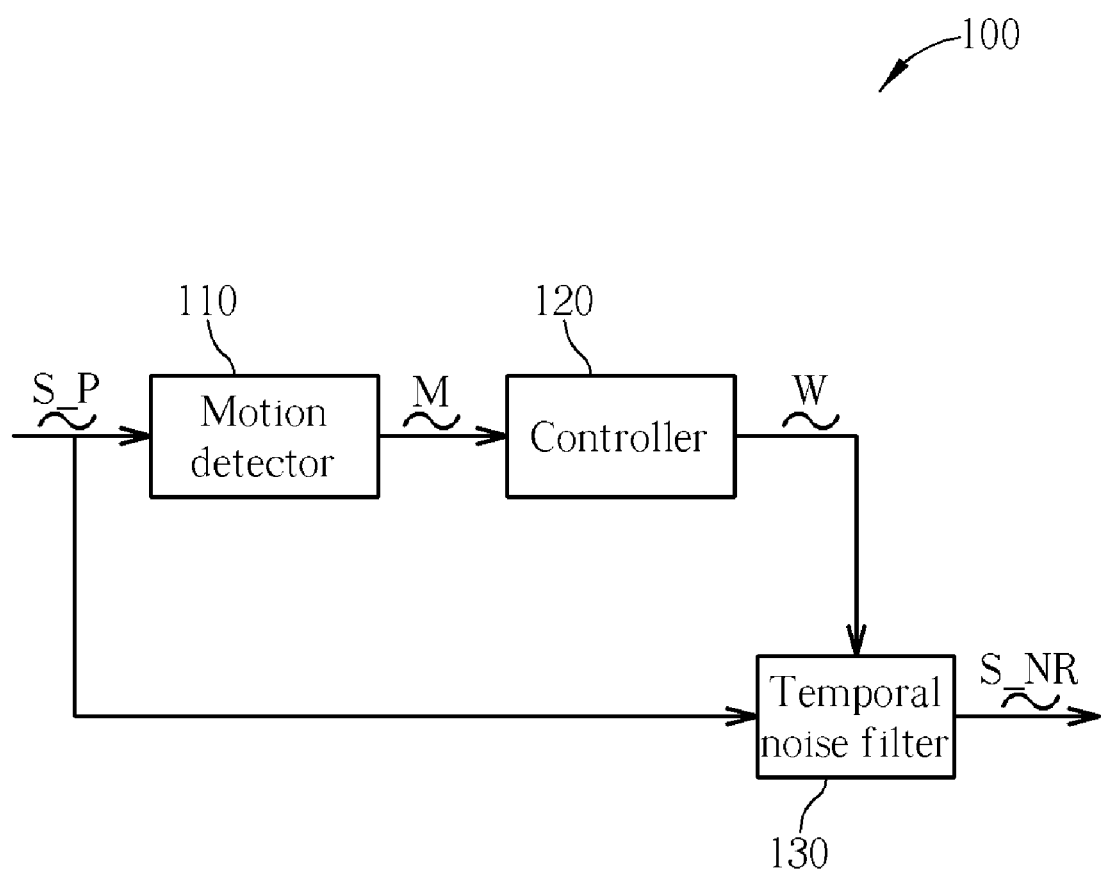
FIG. 1 is a functional block diagram illustrating a typical temporal noise filtering module.
Figure 2:
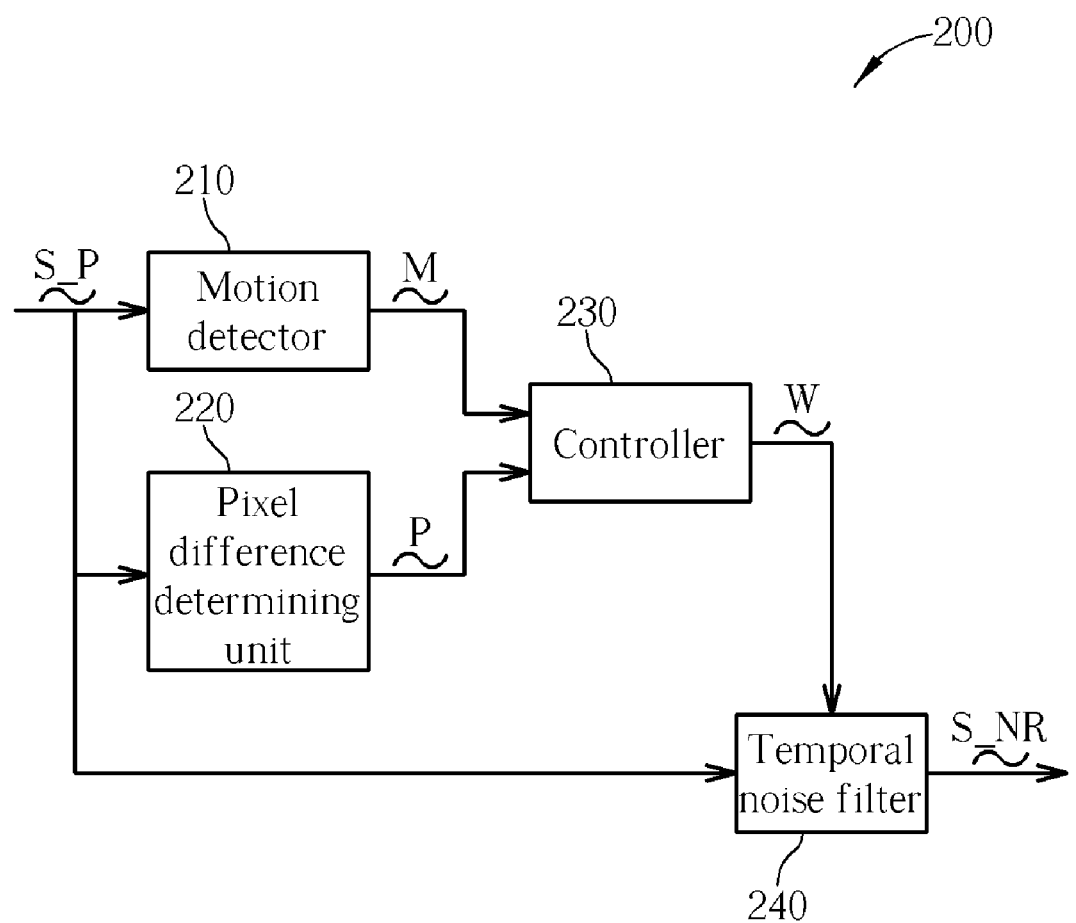
FIG. 2 is a functional block diagram illustrating a temporal noise filtering module according to an embodiment of the present invention.

Please refer to FIG. 2, FIG. 2 is a functional block diagram illustrating a temporal noise filtering module 200 according to an embodiment of the present invention. The temporal noise filtering module 200 comprises a motion detector 210, a pixel difference determining unit 220, a controller 230, and a temporal noise filter 240. Herein the temporal noise filter 240 can be implemented as a low pass filter. The motion detector 210 receives a video signal S_P comprising a plurality of frames, wherein the plurality of frames comprises at least a target frame $F_N$ to be processed. Also, the motion detector 210 compares the target frame $F_N$ with other frames at different timings to determine the degree of motion of the target frame $F_N$. In this embodiment, three frames including the target frame $F_N$, a previous frame $F_{N-1}$ and a following frame $F_{N+1}$ are used as an example to explain the operation of the motion detector 210. However, this example is not meant to limit the scope of the present invention. In other embodiments, a different number of frames may be used; in fact, any number of frames can be used based on various design choices, which will still fall within the scope of the present invention. The motion detector 210 detects the degree of motion between any two of the frames $F_N$, $F_{N-1}$, and $F_{N+1}$, in order to output an image motion determination value M to the controller 230.

Figure 3:
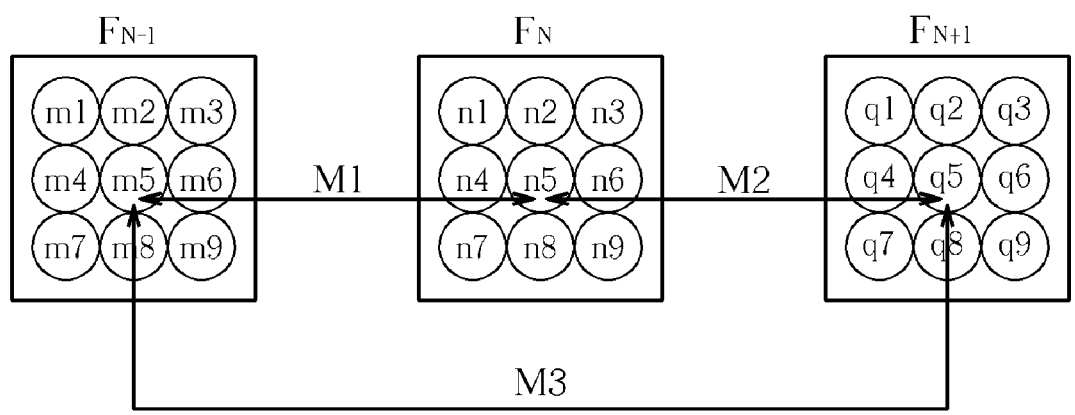
FIG. 3 is a schematic diagram illustrating the pixels of a particular region corresponding to three different image frames.

Please refer to FIG. 3, FIG. 3 is a schematic diagram illustrating pixels of three different frames corresponding to the same region. Said region can be regarded as a detecting window defined by the motion detector 210 for detecting the degree of motion. In practice, the size of the detecting window is not limited. A detecting window comprising nine pixels is used as an example in this embodiment, and is not meant to be limiting. A detecting window with other sizes also fall within the scope of the present invention. The pixels of the frame $F_{N-1}$ falling with in the boundary of the detecting window are pixels m1~m9, and the pixels m1~m9 respectively correspond to the pixels n1~n9 of the frame $F_N$, similarly falling within the boundary of the detecting window, and to the pixels q1~q9 of the frame $F_{N+1}$, similarly falling within the boundary of the detecting window. The motion detector 210 calculates the frame motion determination value M according to the equation below:

$$\begin{cases} M1 = \frac{1}{8}\sum_{k=1}^{9}|mk-nk| \\ M2 = \frac{1}{8}\sum_{k=1}^{9}|nk-qk| \\ M3 = \frac{1}{8}\sum_{k=1}^{9}|qk-mk| \end{cases} \quad \text{Equation (1)}$$

wherein mk, nk, and qk represent the pixel value of their respective frames, which can be the R, G, B pixel values in RGB format, the luminance or chrominance values in YUV format, or any other value representing the pixel value in a known or new format. That is, the sum of absolute differences (SAM) between any two of the $F_{N-1}$, $F_N$, $F_{N+1}$ is calculated in this embodiment, as reference for determining if there is motion in the image. In this way, the frame motion determination value M1 between frames $F_N$ and $F_{N-1}$, the frame motion determination value M2 between frames $F_N$ and $F_{N+1}$, and the frame motion determination value M3 between frames $F_N$ and $F_{N+1}$ can all be obtained. The frame motion determination value M1, M2, and M3 can then be referred to by the controller 230, to determine if the image is dynamic or static, or in other words, in motion or not. In this embodiment, the controller can utilize at least one of the three determination values to determine if the image is static or dynamic. As is well known by persons skilled in the art, the controller 230 can adopt other determination rules or algorithms to determine if the image is static or dynamic according to the determination value. Other than the SAM value, there are other well-known parameters or algorithms that can be used for motion detection.

The pixel difference determining unit 220 also receives the video signal S_P, and calculates the pixel difference between different frames from the same particular region. The pixel difference determining unit 220 processes a plurality of frames, which comprises at least a target frame $F_N$ from the video signal S_P, and the pixel difference determining unit 220 compares the target frame $F_N$ with other frames, to determine the pixel difference. The frames processed by the pixel difference determining unit 220 can be the same as the frames processed by the motion detector 210; that is, the frames $F_N$, $F_{N-1}$, and $F_{N+1}$. The pixel difference determining unit 220 can also process frames different from the frames processed by the motion detector 210. In this embodiment, the target frame $F_N$, the frame $F_{N-1}$ coming before the target frame $F_N$, and the frame $F_{N+1}$ coming after the target frame $F_N$ are chosen as examples for the purpose of explaining the operation of the pixel difference determining unit 220, but this is not meant to limit the scope of the present invention.

The pixel difference determining unit 220 can calculate pixel difference by calculating the difference between pixel values corresponding to the same location of two frames. Specifically, the pixel difference determining unit 220 can calculate the pixel difference value between the pixel m5 in the frame $F_{N-1}$ and its corresponding pixel n5 in the frame $F_N$, as shown in FIG. 3. In this case taking the luminance Y as an example of the pixel value, and the pixel difference value P1 between the pixels m5 and n5 can be shown as below:

$$P1=|Y\_m5-Y\_n5| \quad \text{Equation (2)}$$

Similarly, the pixel difference value P2 of the frames $F_N$ and $F_{N-1}$ can be obtained by:

$$P2=|Y\_n5-Y\_q5| \quad \text{Equation (3)}$$

and the pixel difference value P3 of the frames $F_{N-1}$ and $F_{N+1}$ can be obtained by $$P3=|Y\_q5-Y\_m5|  \quad \text{Equation (4)}$$

It should be noted that the luminance is not necessarily used as pixel characteristic in calculating the pixel difference value. In terms of the YUV format, the chrominance signals U and V can also be used as pixel value for the purpose of calculating pixel difference.

Furthermore, the pixel difference determining unit 220 can also calculate the pixel difference value by calculating the difference between a plurality of pixels corresponding to the same particular region in two frames. As illustrated by the detection window shown in FIG. 3, the pixel difference determining unit 220 can apply a weighted average algorithm upon the pixel value of the nine pixels in the detection window. The formula of Equation (5) can then be used to obtain the weighed average value Y_m, wherein the value sk of Equation (5) indicates the weighting coefficient of each pixel.

$$Y\_m = \frac{1}{(s1+s2+\ldots+s9)}\sum_{k=1}^{9} sk \cdot mk \quad \text{Equation (5)}$$

Similarly, the weighted average values Y_n and Y_q can be obtained with respect to frames $F_N$ and $F_{N+1}$, respectively. Then, pixel characteristic difference value P can be obtained according to equation (6)

$$\begin{cases} P1 = |Y\_m - Y\_n| \\ P2 = |Y\_n - Y\_q| \\ P3 = |Y\_q - Y\_m| \end{cases} \quad \text{Equation (6)}$$

In this way, the pixel difference value P2 between frames $F_N$ and $F_{N+1}$ and the pixel difference value P3 between frames $F_{N-1}$ and $F_{N+1}$ can be obtained. Similarly, the pixel value difference is not necessarily calculated with the luminance value. In terms of the YUV format, the chrominance signals U and V can also be used as pixel value for the purpose of calculating pixel difference value.

Figure 4:
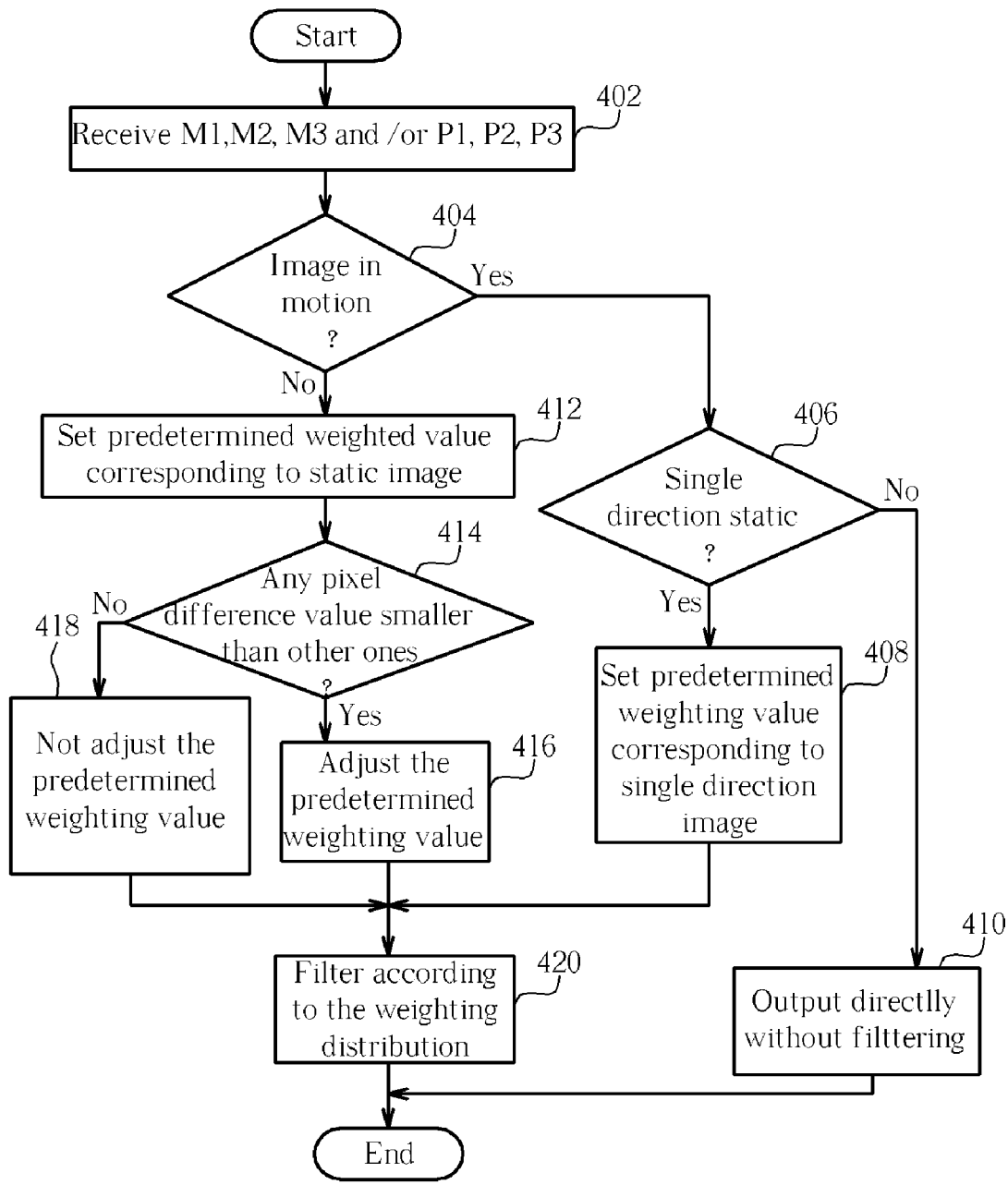
FIG. 4 is a flow chart illustrating the filtering operation of the temporal noise filtering module according to an embodiment of the present invention.

FIG. 4 is a flow chart illustrating the filtering operation of the temporal noise filtering module according to an embodiment of the present invention. In this embodiment, the temporal noise filtering module 200 determines how to filter the image according to the motion determination values M1-M3 generated from the motion detector 210 and/or the pixel difference values P1-P3 generated from the pixel difference determining unit 220. In step 402, the controller 230 receives the image motion determination values M1-M3 and the pixel difference values P1-P3 generated respectively from the motion detector 210 and the pixel difference determining unit 220 as described above. In step 404, the controller 230 determines if there is any motion in the current frame according to the image motion determination values M1-M3; that is, whether the current frame is determined to be a frame in motion or a static frame. In this embodiment, the controller 230 compares the image motion determination values M1-M3 with a first threshold value to determine frame motion. The current frame is determined to be a static frame if all of the image motion determination values M1-M3 are smaller than the first threshold value. However, the current frame is determined to be a frame in motion if any of the image motion determination values M1-M3 is greater than the first threshold value. This does not, however, limit the scope of the present invention, and those skilled in the art can adopt other determination standards to determine whether the frame is in motion or static.

If the controller 230 determines the current frame is a static frame in step 404, then in step 412, the controller 230 will set the weighting value for the filtering operation as a set of first predetermined weighting values corresponding to static frame. In this embodiment, the controller 230 can set the weighting values corresponding to the frames $F_{N-1}$, $F_N$, and $F_{N+1}$ as (1,1,1), (1,2,1), or other predetermined values. Next, the controller 230 determines if there is one of the frames $F_{N-1}$, $F_N$, and $F_{N+1}$ which is significantly different from the other two; in step 414, this is determined by checking whether there is one of the pixel value differences P1-P3 which is significantly smaller than the other two, whether the differences between the smallest of P1-P3 and the other two are both larger than a second threshold value. If indeed there is one of the P1-P3 values that is significantly smaller than the other two, it indicates that the difference between one of the frames $F_{N-1}$, $F_N$, and $F_{N-1}$ (for example, $F_{N-1}$) and the other two frames (for example, $F_N$ and $F_{N+1}$) is much larger than the difference between the two (for example, $F_N$ and $F_{N+1}$). In case of a static frame, this indicates that there is more-than-usual noise in the frame significantly different from the other two, and therefore the weighting value for filtering with respect to said frame should be decreased, in order to reduce the effect of noise on image quality, as shown in step 416. In this embodiment, if the frame $F_{N+1}$ is determined to have more-than-usual noise, the controller 230 can adjust the weighting value to (2,2,1), and the temporal noise filter 240 can perform filtering according to the weighting distribution, as shown in step 420. However, if, according to the determination result of step 414, it can not be determined which one of the three frames contains more noise, then the first predetermined weighting values are used for filtering (step 418, 420). In this embodiment, the filtering operation of the temporal noise filter 240 can be shown as equation (7):

$$Y'\_n5 = (w1 \times Y\_m5 + w2 \times Y\_n5 + w3 \times Y\_q5)/(w1+w2+w3) \quad \text{equation (7)}$$

wherein w1, w2, and w3 are respectively the weighting values of the frames $F_{N-1}$, $F_N$, and $F_{N+1}$. The temporal noise filter 240 can not only be designed to filter a single pixel in the detection window, as shown in equation 7, but can also be designed to filter all of the pixels in the detection window. The temporal noise filter 240 first performs weighted averaging respectively on the pixel values of the nine pixels within the detection window of the three frames $F_{N-1}$, $F_N$, and $F_{N-1}$, according to Equation (5), to obtain three weighed average values Y_m, Y_n, and Y_q, and then calculates the filtered luminance values of all the pixels in the detection window of the frame $F_N$ according to equation (8) as follows:

$$Y'\_n = (w1 \times Y\_m + w2 \times Y\_n + w3 \times Y\_q)/(w1+w2+w3) \quad \text{equation (8)}$$

Of course, other filtering methods known or new to persons skilled in the art can also be alternatively used.

If in step 404 the controller 230 determines that the current frame is a frame in motion, the controller 230 then further determines if the current frame shows the characteristic of "single-direction static", as shown in step 406. That is to say, although the current frame is determined to be non-static jointly in view of present information, past information, and future information, it is still desirable and of merit to further determine whether the current frame is static viewed from past to present ("backward static"), and whether the current frame is static viewed from present to future ("forward static"), both of which are herein termed as "single-direction static". If it is determined that a situation of single-direction static exists, then the noise filtering operation should refer only to the information of the static portion in time, and exclude the information of the portion in motion from its calculation. In this embodiment, the controller 230 checks if any of the following two situations exists: M1 and M3 are both larger than a third threshold value and M2 is smaller than the third threshold value, which indicates that the current frame is forward static; or M2 and M3 are both larger than a third threshold value and M1 is smaller than the third threshold value, which indicates that the current frame is backward static. If any of the above-mentioned situations occurs, the controller 230 sets the weighting value for filtering operation as a set of second predetermined weighting values corresponding to single-direction image, as shown in step 408. In this embodiment, if the current frame is forward static, the weighting factor is set as (0,1,1), and if the current frame is backward static, the weighting value is set as (1,1,0). Then, the filtering operation is performed with the weighting values so set, as shown in step 420.

In step 406, if the determination result does not fit into one of the two above-mentioned situations, it indicates that the current frame includes no single-direction static characteristics and is completely an image in motion. In this case, the temporal noise filtering module 200 will not perform temporal noise filtering and directly outputs the image as originally received.

Figure 5:
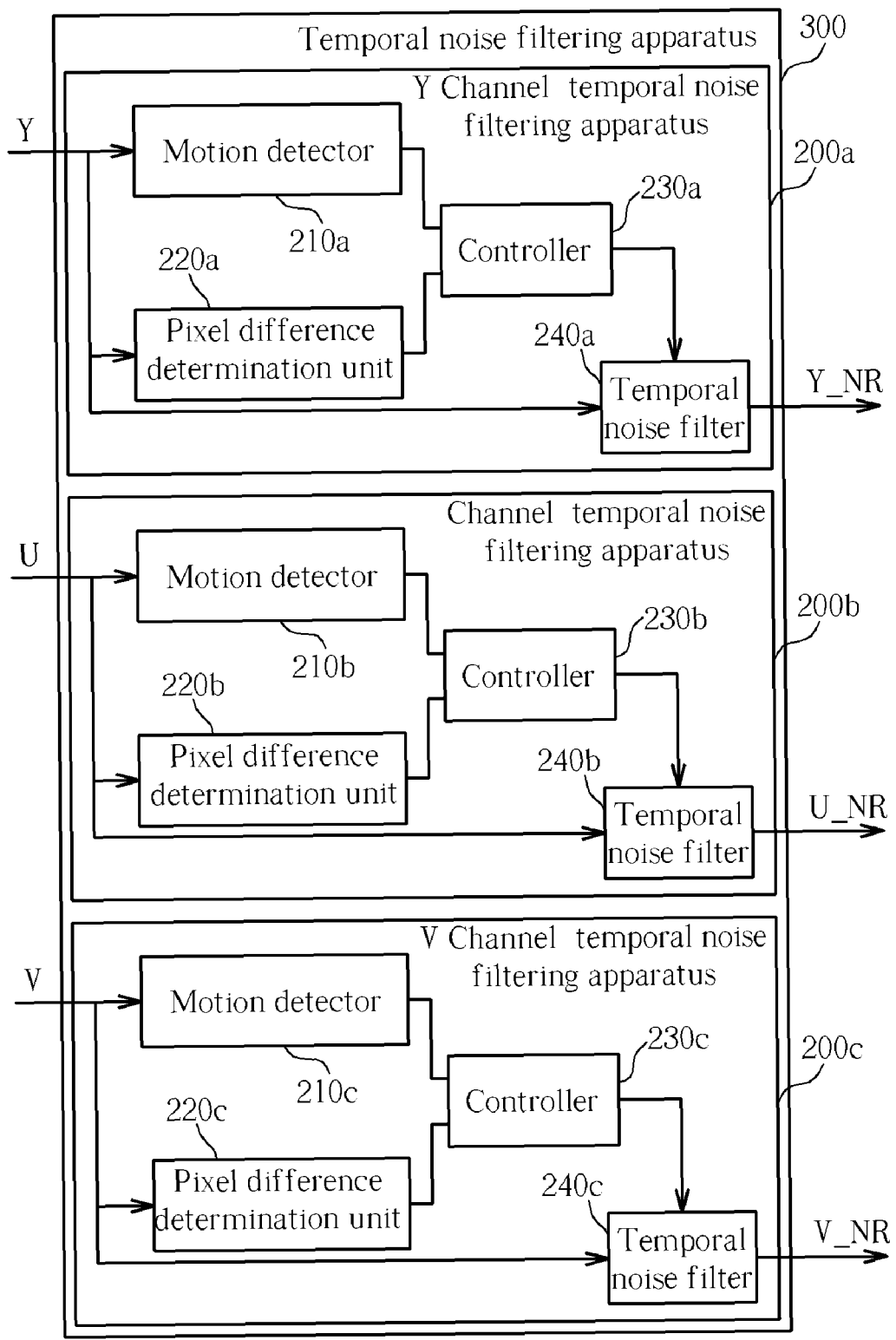
FIG. 5 is a functional block diagram illustrating a temporal noise filtering apparatus according to an embodiment of the present invention.

In order to obtain the best temporal noise filtering result, an embodiment of the present invention provides a temporal noise filtering apparatus to provide separate and independent hardware in different channels, so that each channel can perform temporal noise filtering according to pixel information and determination of its own, and therefore image quality is not degraded due to noise filtering based on determination results of other channels. FIG. 5 is a functional block diagram illustrating a temporal noise filtering apparatus according to an embodiment of the present invention. As shown in FIG. 5, the temporal noise filtering apparatus 300 comprises a Y channel temporal noise filtering module 200a for the Y channel, a U channel temporal noise filtering module 200b for the U channel, and a V channel temporal noise filtering module 200c for the V channel. In this way, each channel can reference the determination result of its own determination result, to perform temporal noise filtering, allowing the best effect to be reached. The temporal noise filtering modules 200a, 200b, and 200c can even adopt different motion detection strategies, different pixel difference detection strategies, different controlling algorithms, and/or different filtering algorithms, to provide more design flexibility.

As described above, the temporal noise filtering mechanism disclosed by the present invention not only determines the degree of motion of the images, but also determines the pixel difference value, so as to decide how to reduce, or suppress, temporal noise in the video image frames. This allows noise along the time axis being more accurately accounted for.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing temporal noise comprising:
    performing motion detection on a plurality of frames of a video data stream;
    performing a first determination to determine if a current frame is static by comparing the current frame to at least one previous frame in a time domain, and determining if the current frame is in motion by comparing the current frame to at least one following frame in the time domain and generating at least one first detection value according to a first channel information from a plurality of frames in a video data stream;
    determining a set of a plurality of first weighting values for temporal filtering operations of the first channel according to the first detection value;
    generating at least one first pixel difference value according to the first channel information from the frames of the video data stream;
    setting a weighting value for temporal filtering operations as a set of a plurality of first predetermined weighting values if the first determination determines the current frame is static;
    performing temporal filtering to the first channel information of the video data stream according to the set of first weighting values;
    performing a second determination to determine if the current frame is static by comparing the current frame to at least one following frame in the time domain, and determining if the current frame is in motion by comparing the current frame to at least one previous frame in the time domain and generating at least one second detection value according to a second channel information from a plurality of frames in a video data stream;
    determining a set of a plurality of second weighting values for temporal filtering operations of the second channel according to the second detection value;
    setting a weighting value for temporal filtering operations to a set of a plurality of second predetermined weighting values if the second determination determines the current frame is static;
    performing temporal filtering to the second channel information of the video data stream according to the set of second weighting values.

2. The method of claim 1, wherein the step of motion detection generates at least one detection value, and the current frame is determined to be static if the corresponding detection value is not over a threshold value, and the current frame is determined to be in motion if the corresponding detection value is over the threshold value.

3. The method of claim 1, wherein the step of motion detection comprises calculating at least one sum of absolute differences (SAD) value between pixel values of the frames from the video data stream.

4. An apparatus for filtering temporal noise, comprising:
    a first channel temporal filtering module, comprising:
        a first motion detector for generating at least one first detection value according to first channel information from a plurality frames in a video data stream;
        a first controller, coupled to the first motion detector, for determining a set of a plurality of first weighting values for temporal filtering operations of a first channel according to the first detection value;
        a first pixel difference calculating unit, coupled to the first controller, for generating at least one first pixel difference value according to the first channel information from the frames of the video data stream; and
        a first filter, coupled to the first controller, for performing temporal filtering to the first channel information of the video data stream according to the set of the first weighting values; and
    a second channel temporal filtering module, comprising:

a second motion detector, for generating at least one second detection value according to second channel information from the frames in the video data stream;

a second controller, coupled to the second motion detector, for determining a set of a plurality of second weighting values for temporal filtering operations of a second channel according to the second detection value; and a second filter, coupled to the second controller, for performing temporal filtering to the second channel information of the video data stream according to the set of the second weighting values.

5. The apparatus of claim 4, wherein the set of first weighting values determined by the first controller is different from the set of second weighting values determined by the second controller.

6. The apparatus of claim 4, wherein the first controller further refers to the first pixel difference value to determine the set of the first weighting values.

* * * * *